United States Patent
Marlatt et al.

(10) Patent No.: US 7,146,422 B1
(45) Date of Patent: Dec. 5, 2006

(54) METHOD AND APPARATUS FOR VALIDATING DOCUMENTS BASED ON A VALIDATION TEMPLATE

(75) Inventors: David A. Marlatt, SanDiego, CA (US); John B. Abjanic, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/562,104

(22) Filed: May 1, 2000

(51) Int. Cl.
  *G06F 15/16* (2006.01)
  *G06F 15/173* (2006.01)
(52) U.S. Cl. ............... 709/227; 709/202; 709/225; 709/238; 709/246
(58) Field of Classification Search ............ 709/217, 709/232, 225, 238, 246, 230
See application file for complete search history.

(56) References Cited

U.S. PATENT DOCUMENTS

| | | |
|---|---|---|
| 4,216,462 A | 8/1980 | McGrath et al. |
| 5,396,613 A | 3/1995 | Hollaar |
| 5,473,691 A | 12/1995 | Menezes et al. |
| 5,550,984 A | 8/1996 | Gelb |
| 5,634,010 A | 5/1997 | Ciscon et al. |
| 5,678,010 A | 10/1997 | Pittenger et al. |
| 5,862,328 A | 1/1999 | Colyer |
| 5,862,344 A | 1/1999 | Hart |
| 5,870,605 A | 2/1999 | Bracho et al. |
| 5,875,242 A | 2/1999 | Glaser et al. |
| 5,896,379 A | 4/1999 | Haber |
| 5,931,917 A | 8/1999 | Nguyen et al. |
| 5,937,165 A | 8/1999 | Schwaller et al. |
| 5,943,426 A | 8/1999 | Frith et al. |
| 5,951,650 A | 9/1999 | Bell et al. |
| 5,956,339 A | 9/1999 | Harada et al. |
| 5,987,132 A | 11/1999 | Rowney |
| 5,987,232 A * | 11/1999 | Tabuki ............... 713/201 |
| 5,987,500 A | 11/1999 | Arunachalam |
| 5,995,625 A | 11/1999 | Sudia et al. |
| 6,002,767 A | 12/1999 | Kramer |
| 6,006,264 A | 12/1999 | Colby et al. |
| 6,011,910 A | 1/2000 | Chau et al. |
| 6,012,098 A | 1/2000 | Bayeh et al. |
| 6,018,721 A | 1/2000 | Aziz et al. |
| 6,018,801 A | 1/2000 | Palage et al. |
| 6,026,379 A | 2/2000 | Haller et al. |
| 6,032,190 A | 2/2000 | Bremer et al. |
| 6,038,488 A * | 3/2000 | Barnes et al. ............. 700/161 |
| 6,061,734 A * | 5/2000 | London ............... 709/238 |
| 6,067,354 A | 5/2000 | Bauer et al. |
| 6,076,107 A | 6/2000 | Chen et al. |
| 6,091,724 A | 7/2000 | Chandra et al. |
| 6,105,008 A | 8/2000 | Davis et al. |
| 6,167,438 A | 12/2000 | Yates et al. |

(Continued)

OTHER PUBLICATIONS

Bray et al.; Extensible Markup Language (XML) 1.0; Feb. 10, 1998; http://www.w3.org/TR/1998/REC-xml-19980210.pdf.*

(Continued)

*Primary Examiner*—Rupal Dharia
*Assistant Examiner*—Quang N. Nguyen
(74) *Attorney, Agent, or Firm*—Kacvinsky LLC (57) ABSTRACT

A network apparatus is provided between a network and a plurality of processing nodes or application servers. The network apparatus includes a validation accelerator to validate (or pre-validate) a document based on validation instructions provided in the document. After the document is validated, the validation instructions are removed or stripped from the document, and the document is then sent to a processing node or application server for processing.

28 Claims, 5 Drawing Sheets

U.S. PATENT DOCUMENTS

| | | | |
|---|---|---|---|
| 6,167,448 A | 12/2000 | Hemphill et al. | |
| 6,167,523 A * | 12/2000 | Strong | 709/219 |
| 6,219,691 B1 | 4/2001 | Youn | |
| 6,226,675 B1 | 5/2001 | Meltzer et al. | |
| 6,256,676 B1 * | 7/2001 | Taylor et al. | 709/246 |
| 6,266,335 B1 | 7/2001 | Bhaskaran | |
| 6,343,738 B1 | 2/2002 | Ogilvie | |
| 6,366,663 B1 * | 4/2002 | Bauer et al. | 379/221.13 |
| 6,375,469 B1 | 4/2002 | Brown | |
| 6,400,381 B1 * | 6/2002 | Barrett et al. | 345/758 |
| 6,408,311 B1 | 6/2002 | Baisley et al. | |
| 6,415,318 B1 | 7/2002 | Aggarwal et al. | |
| 6,442,588 B1 | 8/2002 | Clark et al. | |
| 6,477,646 B1 | 11/2002 | Krishna et al. | |
| 6,480,860 B1 | 11/2002 | Monday | |
| 6,480,865 B1 | 11/2002 | Lee et al. | |
| 6,507,856 B1 | 1/2003 | Chen et al. | |
| 6,507,857 B1 | 1/2003 | Yalcinalp | |
| 6,512,824 B1 * | 1/2003 | Hsieh et al. | 379/230 |
| 6,519,617 B1 * | 2/2003 | Wanderski et al. | 715/513 |
| 6,567,853 B1 * | 5/2003 | Shomler | 709/229 |
| 6,571,279 B1 * | 5/2003 | Herz et al. | 709/217 |
| 6,584,459 B1 | 6/2003 | Chang et al. | |
| 6,591,260 B1 * | 7/2003 | Schwarzhoff et al. | 707/2 |
| 6,600,683 B1 | 7/2003 | Yamane | |
| 6,621,505 B1 | 9/2003 | Beauchamp et al. | |
| 6,629,146 B1 * | 9/2003 | Mohri | 709/232 |
| 6,631,497 B1 * | 10/2003 | Jamshidi et al. | 715/514 |
| 6,654,914 B1 | 11/2003 | Kaffine et al. | |
| 6,658,260 B1 | 12/2003 | Knotts | |
| 6,675,219 B1 * | 1/2004 | Leppinen et al. | 709/230 |
| 6,766,305 B1 * | 7/2004 | Fucarile et al. | 705/51 |
| 6,925,631 B1 | 8/2005 | Golden | |
| 2002/0099734 A1 | 7/2002 | Yassin et al. | |

OTHER PUBLICATIONS

"The Advantages of F5's HTTP Header Load Balancing Over Single-Point URL Parsing Solutions", F5 Networks, Inc., pp. 1-2. Retrieved from the www on Mar. 16, 2005 at: <f5.com/solutions/archives/whitepapers>.

Aaron Skonnard, "Soap: The Simple Object Access Protocol", Microsoft Corporation, pp. 1-10, Retrieved from the www on Mar. 16, 2005 at: <microsoft.com/mind/0100/soap/soap>.

* cited by examiner

METHOD AND APPARATUS FOR VALIDATING DOCUMENTS BASED ON A VALIDATION TEMPLATE

FIELD

The invention generally relates to computers and computer networks and in particular to a network apparatus for validating documents.

BACKGROUND

While increasingly more successful in their roles as store and forward data systems, computer networks such as the Internet are experiencing tremendous growth as transaction-based, mission critical business applications, Web site owners, and business servers are overwhelmed by explosive traffic growth. Application servers and other processing nodes can be overwhelmed with the responsibility to perform a variety of functions, including establishing connections with remote servers or clients, encrypting and decrypting transmitted information, processing the received data or transaction information (e.g., purchase orders, requests for web pages, etc.), formatting information for display or processing etc. To account for the high volume of traffic and the increasingly complex number of tasks required of application servers, the traditional solution has been to buy more servers and more network bandwidth, which can be cost prohibitive. XML, or extensible Markup Language v. 1.0 was adopted by the World Wide Web Consortium (W3C) on Feb. 10, 1998. XML provides a structured syntax for data exchange. XML is a markup language, like Hyper-Text Markup Language (HTML). In XML, the actual data is separated from the presentation of the data, in contrast with HTML which combines these two items. Most markup languages, like HTML, are fixed markup languages. That is, the fixed markup languages (including HTML) include a set of fixed tags for crafting a document. On the other hand, XML does not define a fixed set of tags, but rather, only defines a syntax or structured format through which users can define their own set of tags. There presently are a number of XML based languages (e.g., WML, CXML, CBL) which define their own set of XML tags using the XML syntax.

The XML standard only requires that a received document be checked to confirm that it meets the basic syntax and format of XML (i.e., determine whether the document is "well formed"). In addition, the XML standard also allows a document to be validated, which is a more rigorous check to determine if the structure or grammar of the XML document complies with structure required by the particular XML based language. Although not required by the XML specification, many application servers or other processing nodes that process XML documents include a validating XML processor (or a validating XML parser) to check the XML application data for validity against a validation template. Validation is important because it can ensure that the application data (e.g., transaction information) in the XML document is provided in the correct format and should be correctly interpreted by the application server.

Current XML processing usually involves an XML application server receiving an XML document from a source application and then fully processing the document and optionally providing a response to the source application. An XML document is typically processed through three steps.

1) A check to determine if the document is "well formed".
2) An optional validation check to guarantee the syntax and grammar match a particular validation template.
3) Traditional parsing of the content for meaning and application to the problem domain (e.g., processing the application data or transaction data).

The second step, validation, can be computationally very expensive from both a processor and elapsed time point of view. In order to validate a document, an XML application must either retrieve a validation template from somewhere on the network or must parse (or identify) the validation template out of the XML document itself (if the validation template is provided within the XML document). Once the application server has the validation template it then must parse the application data and check that it matches the validation template rules. As a result, the burden of performing document validation can significantly decrease the number of documents or transactions that can be processed by the application server or processing node.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

For example, some of the techniques of the invention will be illustrated and described with reference to an XML message and XML processing. The use of an XML message and XML processing are used only to explain and describe the techniques of the invention. However, the invention is not limited to XML or similar languages, but is applicable to messages provided in a wide variety of structured formats or languages.

The following represents brief descriptions of the drawings, wherein.

DETAILED DESCRIPTION

According to an example embodiment, a network apparatus is provided between a network and a plurality of processing nodes (e.g. web servers, application servers, XML servers, routers, switches or other devices). The network apparatus includes a validation accelerator to pre-validate documents.

According to an embodiment, a message is received including validation instructions and application data. A validation template may be provided either inline (e.g., internal to the document as part of the validation instructions) or as an external validation template. If the validation document is external, the template can be retrieved from a network (or remote server) and can be locally cached for future use to improve validation speed. The document is then validated based on the template, and the validation instructions are then removed from the document. The pre-validated document is then sent to a processing node or application server.

Because the validation instructions (including an internal validation template and/or a pointer to an external template) have been removed from the document, the application server will not validate the document and will presume that the document is valid. In this manner, the expensive task of document validation can be off-loaded from the application server to a network apparatus, such as a validation accelerator.

According to another embodiment, the network apparatus may include other functions or blocks, such as a security accelerator, a content based message director and/or a load balancer.

Figure 1:
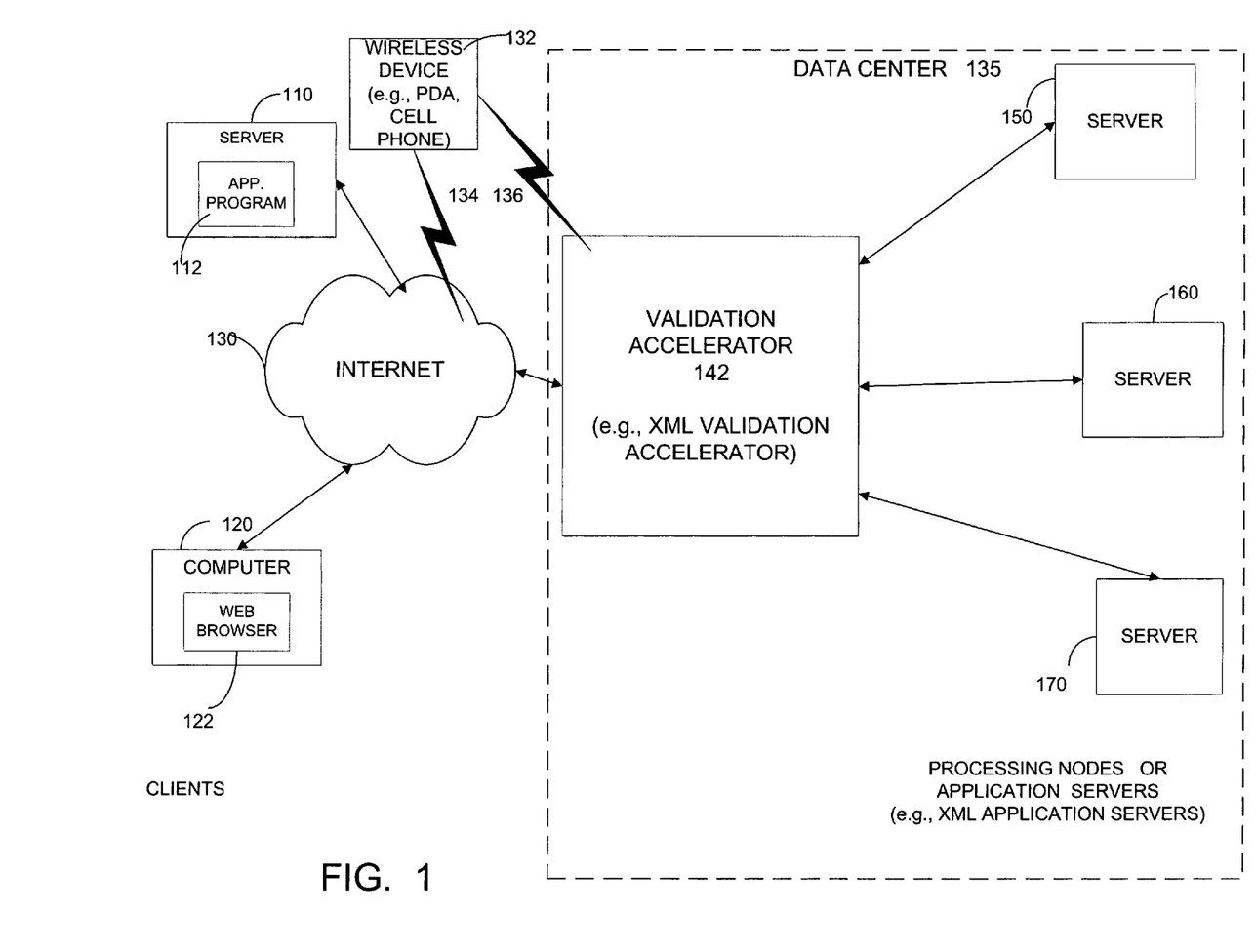
FIG. 1 is a block diagram of a network system according to an example embodiment.

Referring to the Figures in which like numerals indicate like elements, FIG. 1 is a block diagram of a network system according to an example embodiment. As shown in FIG. 1, a variety of clients may be coupled or connected to a data center 135 via a network, such as the Internet 130. The clients, for example, may include a server 110 that includes an application program 112, a computer 120 (such as a personal computer or laptop) that may include a web browser 122 and a wireless device 132, such as a personal digital assistant (PDA) or a wireless (or cellular) telephone. Wireless device 132 may be coupled to the Internet 130 or to a data center 135 via communications links 134 and/or 136, respectively. Links 134 and 136 each may include one or more of a wireless link (e.g., cellular or other link) or a wireline link. Each of the clients, including server 110, computer 120 and device 132 can send and receive messages over the Internet 130 and may use a variety of different protocols or transports.

The data center 135 is provided for sending, receiving, processing and fulfilling a wide variety of messages and requests, such as business transactions, purchase orders, stock quotes or stock trades, and other information. The data center 135 includes several processing nodes (e.g., servers), including server 150, server 160 and server 170 for handling the various orders, business transactions and other requests.

According to an example embodiment, the clients and the entities of data center 135 exchange messages that include application data to be processed by an application program (such as an XML processor). The application data in the message may include business transaction information which may describe or relate to one or more transactions. According to an embodiment, the application data provided in a message may advantageously be provided as XML data (e.g., as a XML document) or in another structured format or other markup language to facilitate data exchange. The XML data in the messages preferably complies with the format or syntax required by the XML standard. A document that uses tag formats (e.g., start tags, end tags) and other syntax (e.g., to markup data) that complies with the XML standard is considered to be a "well-formed" XML document.

Referring to the clients again in FIG. 1, application program 112 may be a business program or a program for managing inventory, orders or other business transactions. For example, application program 112 may automatically and electronically detect that inventory has decreased below a threshold value and then automatically generate and send a purchase order to a supplier's server at data center 135 to request a shipment of additional supplies or inventory. Thus, server 110 may initiate, for example, a business-to-business (B2B) transaction by sending an electronic order to the supplier's remote server located at data center 135.

As a another example, web browser 122 may request web pages, business information or other information from a remote server (e.g., located at data center 135). Web browser 122, may also send or post purchase orders, business transactions or other business information to a remote server, which may be located at data center 135. Wireless device 132 may receive information or data related to purchase orders, business transactions, web pages, stock quotes, game scores and the like from one or more remote servers (such as servers located at data center 135).

According to an embodiment, the server 110, computer 120 and wireless device 132 each may communicate or interchange data with one or more remote servers (e.g., servers 150, 160 and 170) by sending and receiving XML data (i.e., application data or business transaction information that is encoded or formatted according to the XML standard or according to one or more XML based languages).

According to an advantageous embodiment, the data center 135 also includes a validation accelerator 142 to pre-validate received messages before the messages are sent to one of the application servers or processing nodes. According to an example embodiment, the validation accelerator 142 is provided as a network apparatus. In other words, according to an example embodiment, the validation accelerator 142 can be coupled between a network 130 and a plurality of processing nodes or application servers (e.g., servers 150, 160 and 170). Providing the validation accelerator 142 as a network apparatus (i.e., separate from the application servers) allows the computationally expensive task of document validation to be off-loaded from the application servers to the validation accelerator 142. Alternatively, a plurality of validation accelerators 142 may be provided, with one validation accelerator 142 being provided for one or more application servers or other processing nodes.

As noted above, an XML document must be checked to ensure it meets the basic syntax and format of XML (i.e., determine whether the document is "well formed"). In addition, the XML standard also optionally allows a document to be validated, which is a more rigorous check to determine if the structure or grammar of the XML document complies with structure or grammar required by the particular XML based language. XML allows a document to be validated against a validation template. A validation template defines the grammar and structure of the XML document (including required elements or tags, etc.).

There can be many types of validation templates such as a document type definition (DTD) in XML or a schema, as examples. These two validation templates are used as examples to explain some features according to example embodiments. Many other types of validation templates are possible as well. A schema is similar to a DTD because it defines the grammar and structure which the document must conform to be valid. However, a schema can be more specific than a DTD because it also includes the ability to define data types (e.g., characters, numbers, integers, floating point, or custom data types). In addition, unlike a DTD (under present standards), a schema may be required to be well formed. Thus, both the application data and the schema can both be parsed and checked for basic syntax (or wellformedness). Therefore, at least for some applications, it is expected that schemas will possibly become more common than DTDs in the future.

As noted above, validating a received document against a validation template is optional according to the XML standard. If a document is to be validated against a particular validation template, the XML document will include validation instructions (or validation code) at the beginning of the document. One example of validation instructions can be a document type declaration, as commonly known in XML. Another example is a schema (or a reference to an external schema). According to current XML, the validation instructions (e.g., document type declaration or schema, etc.) is an optional area of the document that declares the structure, element types, attributes, etc. of the validation template. To be a valid document, the structure and grammar of the application data in the document must match the structure and grammar defined by the validation template (if validation instructions are included in the document). The validation template can be provided internal to (or within) the document and/or external to the document.

Figure 2:
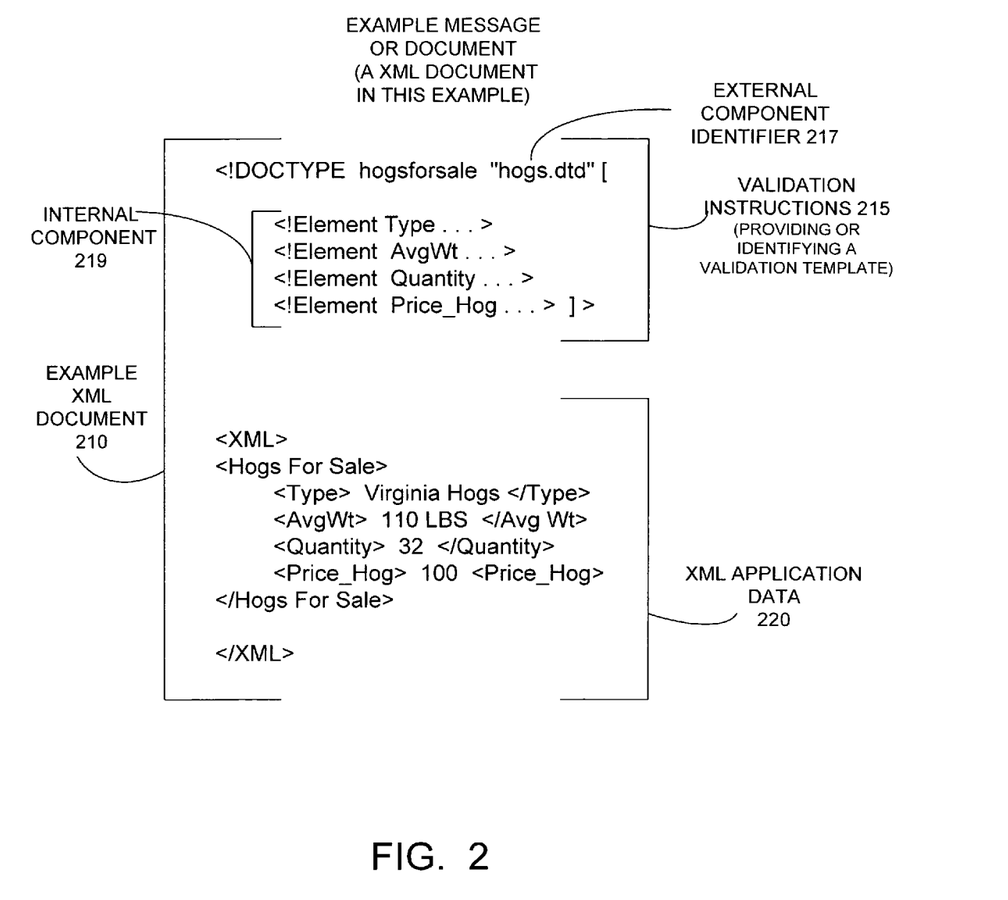
FIG. 2 is a flow chart illustrating an operation of a validation accelerator according to an example embodiment.

FIG. 2 is a diagram illustrating an example message according to an example embodiment. The example message shown in FIG. 2 includes an XML document 210. XML document 210 includes XML application data 220 (e.g., including business transaction information) and validation instructions 215.

The application data 220 is the application data that will be processed by an application server. The application data 220 may include, for example, business transaction information, such as a list items to be purchased, prices, quantities or other specific details of a transaction or a request for information (e.g., request for stock quote, transaction details).

According to an embodiment, the presence of one or more validation instructions 215 indicates that the document can (or should) be validated before processing the application data 220 based on a validation template provided within and/or identified by the validation instructions 215. In other words, according to an embodiment, the presence of validation instructions may indicate that the application data should be pre-validated at a network apparatus (such as validation accelerator 142) before passing the data to an application server for further processing. To indicate to the application server that the document (or the application data) has been validated, the validation instructions may be removed from the document and/or an indication (such as a comment or instruction in the data or a field set in the message) may be provided to indicate that the application data or message has been validated (i.e., pre-validated). According to current XML, document validation is optional (e.g., by the application server), even when validation instructions 215 are present. However, it is possible that in the future, validation (in XML or other languages) may be required.

If the document should be associated with a validation template (document type definition, schema, etc.) for document validation (i.e., to allow document validation), the document will typically include one or more validation instructions 215. The validation instructions 215 provide or identify the validation template (or document type definition) which defines the document structure and grammar (e.g., elements, attributes) to which the application data 220 of document 210 must conform. The validation template can include an internal component and/or an external component.

In this example shown (e.g., for XML), the validation instructions 215 (or validation template) are provided as a document type declaration. The validation instructions 215 begin with the DOCTYPE statement "<DOCTYPE hogsforsale . . . " which indicates that there is a validation template, which may be provided within the document (i.e., as internal component 219) or provided external to the document (i.e., an external component identified as "hogs.dtd"). Therefore, in this example, the validation instructions 215 provide an internal component 219 of a validation template and an external component identifier 217 identifying an external component. The internal component 219 and the external component (not shown) together form the validation template for this document (i.e., for validating the application data 220 for document 210). According to an embodiment, if validation is being performed, the presence of the DOCTYPE statement (or other validation instructions) typically will cause an application or application server to validate the application data 220 in the message against the validation template.

The internal component 219 of the validation template defines that a valid hosgsforsale document must include the following elements: type, avg wt, quantity and price/hog, etc. This is just an example.

In this example, the identifier "hogs.dtd" identifies an external entity or file which is an external component of the validation template. The external component can be located on a remote server or other location based on the external component identifier 217. The external component of the validation template (identified as "hogs.dtd") may include additional requirements on the structure or grammar of the application data 220 of the document 210. The external component identifier 217 may be provided as the complete address, or as a relative address or pointer (e.g., relative to the address or location of the source or originating node of the message). For example, the "hogs.dtd" identifier listed in the validation instructions 215 may actually reference the "hogs.dtd" external component 217 which may be found at (for example): oasis.xml.org/farming/livestock/hogs.dtd. As noted above, examples of validation templates include a Document Type Definition (e.g., for XML), a schema, etc.

Figure 3:
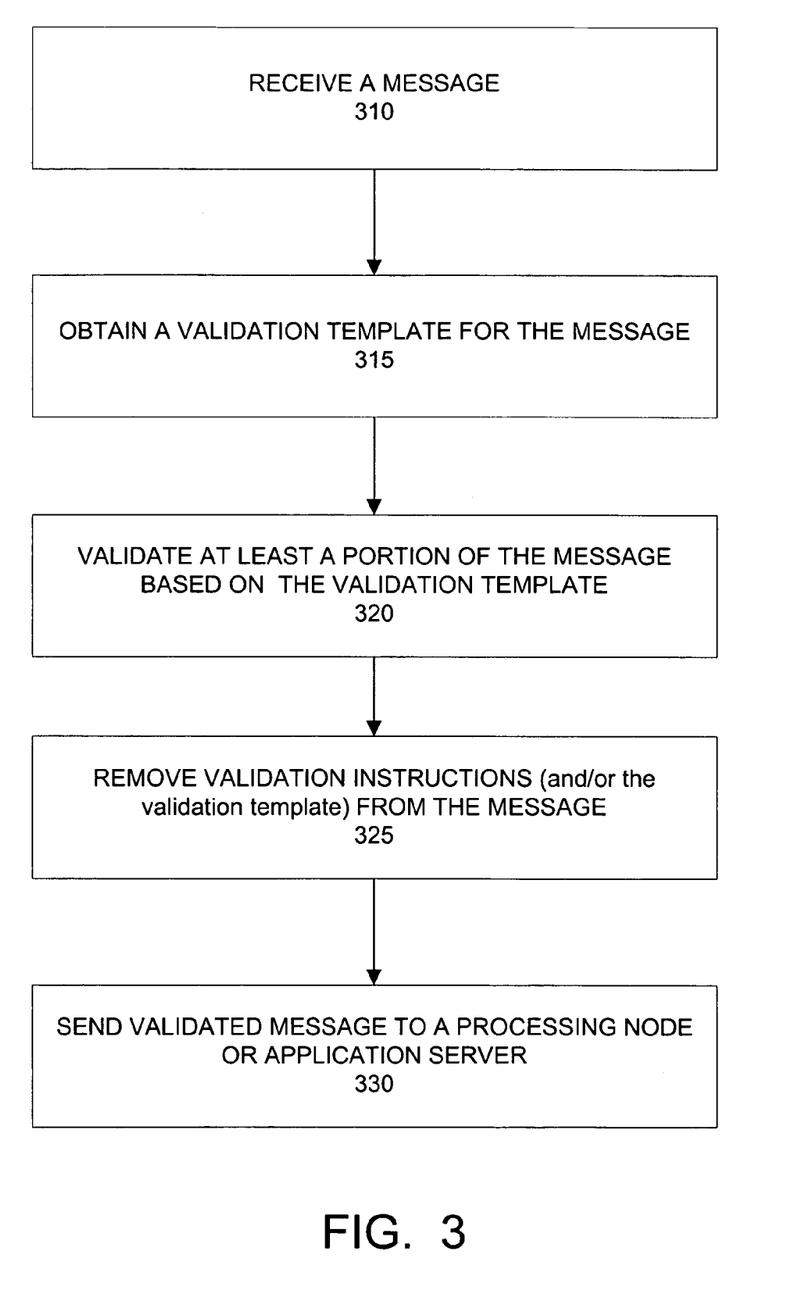
FIG. 3 is a flow chart illustrating an example operation of a validation accelerator according to an example embodiment.

FIG. 3 is a flow chart illustrating an example operation of a validation accelerator according to an example embodiment. At block 310, the validation accelerator 142 receives a message. The message may be sent over any transport or protocol(s), such as Transmission Control Protocol (TCP), File Transfer Protocol (FTP), Simple Mail Transfer Protocol (SMTP), Wireless Application Protocol (WAP, which may be used to send and receive information with wireless devices), Hypertext Transfer Protocol (HTTP), etc. The general teachings and the operation of the invention are not dependent upon any particular transport or protocol, but rather are transport-independent.

At block 315, a validation template is obtained by the validation accelerator 142 for validating the document or message (e.g., for validating the application data 220 in the document 210). This may include first determining if validation instructions are present in the document or message. If no validation instructions are present, then validation will not be performed. If validation instructions are present, the validation accelerator 142 then determines whether the validation template for the document is provided as an internal component and/or an external component based upon the syntax of or one or more statements in the validation instructions 215.

If the validation template is provided within the document (i.e., as an internal component), the validation template is parsed from or separated from the remainder of the document. If the validation instructions 215 provide a external component identifier 217, then the validation accelerator 142 then retrieves or obtains the external component (e.g., from a remote server or node).

At block 320 of FIG. 3, the validation accelerator 142 validates at least a portion of the message (e.g., validates the application data 220) by comparing the structure and grammar of the application data 220 to the structure and grammar defined or required by the validation template.

At block 325, if the document or message is valid, the validation accelerator 142 then removes the (preferably all of the) validation instructions, including any statements that might cause the document to be validated (e.g., a DOCTYPE statement), any internal component(s) of the validation template and any references or identifiers to external components of the validation template.

At block 330, the validated document (with the validation instructions removed) is then sent to an application server or other processing node for processing.

By validating the document and then removing the validation instructions (including the validation template or identifiers thereto), any application program or application server receiving the document will only check whether the document is "well formed" (or meets the basic syntax of XML). Due to the absence of the validation instructions, the application server cannot validate the document, and will assume that the document or application data is valid. In this manner, the burden of performing document validation can be shifted from the application server to the validation accelerator 142.

Figure 4:
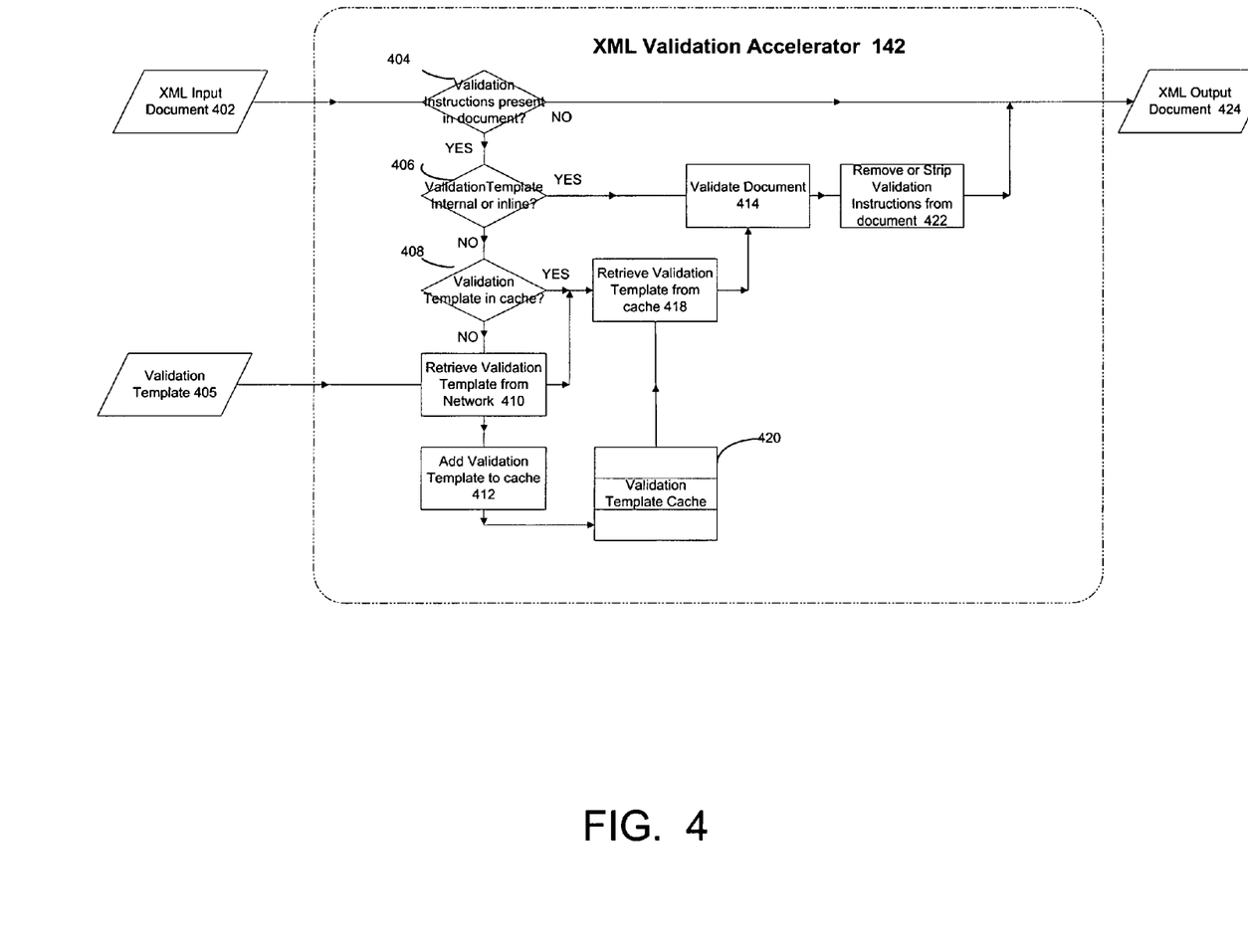
FIG. 4 is a flow chart illustrating an operation of a validation accelerator according to another example embodiment.

FIG. 4 is a flow chart illustrating an operation of a validation accelerator according to another example embodiment. A message, such as an XML document 402, is received. At diamond 404, the validation accelerator checks whether validation instructions are present in the document. If not, the document is output from validation accelerator 142 unchanged because validation cannot be performed, block 424.

If validation instructions are present in the document 402, next the validation accelerator 142 determines whether the validation template is internal (or inline) to the document, diamond 406. If so, then the document is validated based on the internal validation template at block 414.

If the validation template is not internal (or inline) to the document (this indicates that the template should be found as an external component), the validation accelerator 142 then determines whether the validation template (e.g., an external component) is stored in the cache, diamond 408. The validation accelerator 142 includes a high speed memory or local template cache 420 where copies of one or more validation templates (e.g., such as the file "hogs.dtd") can be stored, and then later retrieved. If the validation template is present in the cache 420, the validation template is then retrieved, block 418 and used to validate the document, block 414.

If the validation template is not present in the template cache 420, the validation accelerator 142 then retrieves the validation template from the network (e.g., from a remote server), blocks 410 and 405. The retrieved validation template is then added to (or stored in) the template cache 420, block 412. The document is then validated at block 414.

After the document (or message) is validated at block 414, the validation instructions (including any internal validation template or external template identifier) are stripped or removed from the document, block 422. The validation accelerator 142 then outputs the pre-validated document or message to one of the application servers or processing nodes (e.g., to one of the servers at the data center 135) for processing.

Alternatively (or in addition to removing the validating instructions), an indication can be added to the message indicating to the application server that the application data or message has already been validated (i.e., pre-validated). This pre-validation indication can be provided, for example, as a field in the message, as an instruction or comment in the application data itself, or using another technique. For example, In the XML specification, besides element tags, and data, there is something known as a processing instruction tag which provides an "escape hatch" to allow information specific to an application to be embedded in an XML document. Processing instructions are not considered to be part of the character data content of an XML document, but they are always passed on to the XML application by the parser. The format is <? . . . ?> for the processing instruction tag. Thus, according to one embodiment, after the validation instructions (or the DTD or schema or reference thereto) has been removed, the following comment or instruction tag could be added near the beginning of the document (or other location): <? validated by intel ?>.

By pre-validating the document and then removing the validation instructions from the document (and/or adding a pre-validation indication to the document or message), the expensive step of validation is off-loaded from the application server to a network apparatus, network appliance or other system (which may be referred to, for example, as the validation accelerator 142).

In addition, a local cache 420 is provided to dynamically cache the most recently used (or most common) set of validation templates. Thus, each document that requires validation will typically include a validation template inline (or internal to the document) or will include a reference or pointer (e.g., a Universal Resource Identifier or URI) to identify an external template. The local cache is queried or consulted to determine if the required template is locally stored. If not, then the template is retrieved from the network and then locally cached for future use. This allows validation accelerator 142 to significantly reduce the time or latency to validate a document because a template must be retrieved from the network only once. Thereafter, the template will be provided internal or inline or can be retrieved from local cache.

According to an example embodiment, the cache can be implemented as a fixed size, usage-based stack such that validation templates that are accessed more frequently automatically push lesser-used templates out of the stack when it overflows. According to an embodiment, a least recently used (LRU) algorithm can be used to maintain the most recently used validation templates in the local cache, and to discard (or move to other memory, such as RAM or hard disk drive) the less frequently used templates. In this manner, the time to retrieve or obtain an external component of the validation template (or an external validation template) can be greatly reduced.

Referring to FIG. 4 again, at block 414, the document is validated. If it is valid, the pre-validated document (along with the pre-validation indication) is forwarded to an application server. However, if the document is invalid (i.e., does not match the structure and grammar required by the validation template), then several possibilities exist. The invalid document can be forwarded (without stripping the validation instruction and without adding a pre-validation indication) to an application server. Alternatively, the invalid message can be blocked or not forwarded to a server. Whether blocked or forwarded, the validation accelerator 142 may send a message to the originating node (or sender) that the message or document is invalid).

As described above, a pre-validation indication can be added to a document or message after the message or data has been validated. This pre-validation indication can be in an implicit form of missing (or removed) validation instructions (i.e., where the absence of the validation instructions indicates that the document is valid or has been validated). Alternatively, the pre-validation indication can be in the form of an explicit statement or indication (e.g., a statement, instruction or comment added to the message or document) indicating that the message or application data has been validated.

While the validation accelerator 142 has been described above as performing validation using a validation template, in another embodiment, validation accelerator 142 may merely parse the document and determine whether the application data in the document is well formed (i.e., meets the basic syntax and format requirements for the language). A pre-validation indication may then be added to indicate to the application server that the message or document is well formed (e.g., meets the required syntax).

Figure 5:
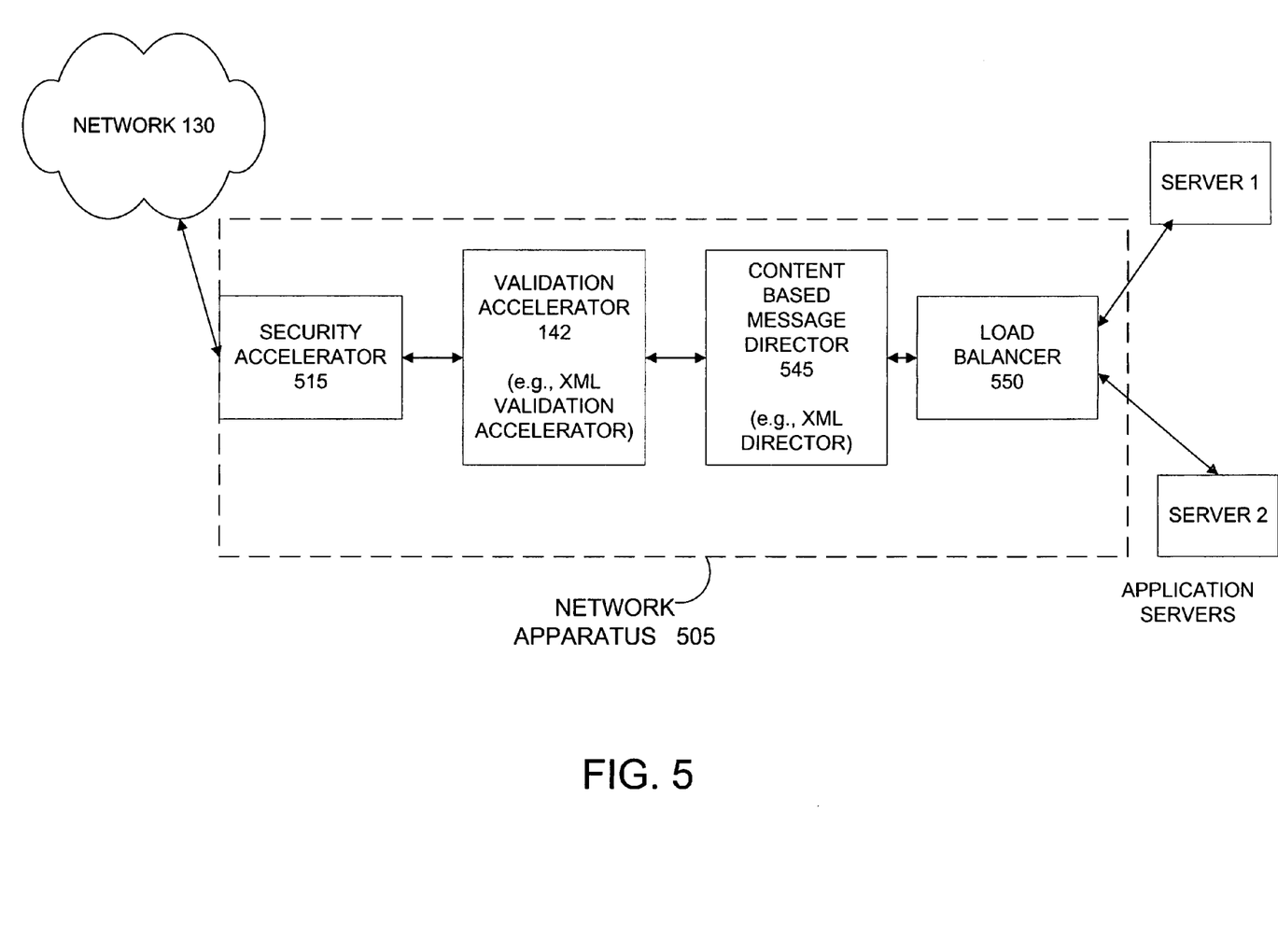
FIG. 5 is a block diagram illustrating a network apparatus according to another example embodiment.

FIG. 5 is a block diagram illustrating a network apparatus according to another example embodiment. According to an example embodiment, network apparatus 505 may include one or more of the blocks shown in FIG. 5. For example, in addition to the validation accelerator 142, a network apparatus 505 may include a security accelerator 515, a content based message director 545 and/or a load balancer 550. Alternatively, all four of the components can be provided in a network apparatus 505, or any sub-combination thereof.

The security accelerator 515 is provided for encrypting outgoing messages and/or decrypting incoming messages received from the network 130. According to an embodiment, the security accelerator 515 is a Secure Sockets Layer (SSL) accelerator, available from Intel Corporation. The security accelerator 515 allows the security related tasks such as encryption and/or decryption to be off-loaded from the application servers to the security accelerator 515.

The content based message director 545 (e.g., a XML director) is provided to route or direct received messages to one of the processing nodes or application servers based upon the content of the application data in the message, including business transaction information. The application data (including business transaction information) may advantageously be provided as a XML based language.

The load balancer 550 is provided to balance or adjust the traffic or messages among one or more of servers or processing nodes within the data center 135, based on one or more load balancing algorithms, such as round robin or other algorithm.

According to an embodiment, when the load balancer 550 and the message director 545 are used together, the message director 545 may make a switching decision based on the content of the application data (including business transaction information). The load balancer 550 may then switch or route the message to a server or node based (in part) on the switching decision. Alternatively, the message director 545 may make a switching decision and then just route or direct the message to a specific server or node.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A network apparatus coupled between a network and a plurality of processing nodes or applications servers, the network apparatus comprising:

a validation accelerator operable to validate at least a portion of a message based on a validation template, if the at least portion of the message is valid, said validation accelerator operable to store said validation template in a local cache after validating and to remove validation instructions from the message before sending the message to an application server or other processing node, the validation instructions comprising at least one of said validation template and a pointer to said validation template;

otherwise, said validation accelerator operable to block or inhibit sending of the message.

2. The network apparatus of claim 1 wherein the validation accelerator comprises a XML validation accelerator to validate XML messages.

3. A validation accelerator coupled between a network and a plurality of processing nodes or application servers, the validation accelerator operable to validate at least a portion of a message based on a validation template, if the at least portion of the message is valid, said validation accelerator operable to store said validation template in a local cache after validating and to remove validation instructions from the message before sending the message to an application server or other processing node, said validation instructions comprising at least one of said validation template and a pointer to said validation template;

otherwise, said validation accelerator operable to block or inhibit sending of the message.

4. The network apparatus of claim 3 wherein the validation accelerator comprises a XML validation accelerator to validate XML messages.

5. The network apparatus of claim 3 and wherein the validation accelerator to add a pre-validation indication to the message before sending the message to an application server or other processing node.

6. A data center comprising:

a plurality of processing nodes to process messages; and a validation accelerator coupled between a network and a plurality of processing nodes, the validation accelerator operable to validate at least a portion of a message based on a validation template, if the at least portion of the message is valid, said validation accelerator operable to store said validation template in a local cache after validating and to remove validation instructions from the message before sending the message to one of the processing nodes, said validation instructions comprising at least one of said validation template and a pointer to said validation template;

otherwise, said validation accelerator operable to block or inhibit sending of the message.

7. A network apparatus coupled between a network and a plurality of processing nodes or applications servers, the network apparatus comprising:

a security accelerator;

a validation accelerator coupled to the security accelerator operable to validate at least a portion of a message based on a validation template, if the at least portion of the message is valid, said validation accelerator operable to store said validation template in a local cache after validating, to remove validation instructions from the message, said validation instructions comprising at least one of said validation template and a pointer to said validation template and to add a pre-validation indication to the message before forwarding the valid message to one of the processing nodes or applications servers;

otherwise, said validation accelerator operable to block or inhibit forwarding of the message.

8. A method comprising:

receiving a message including application data and validation instructions;

obtaining a validation template for the message based on the validation instructions;

validating at least a portion of the application data based on the validation template;

if the at least portion of the application data is valid, then storing the validation template in a local cache;

removing the validation instructions from the message, said validation instructions comprising at least one of said validation template and a pointer to said validation template; and sending the validated message to a processing node or application server for processing;

otherwise, blocking or inhibiting sending of the message.

9. The method of claim 8 wherein the obtaining a validation template includes parsing an internal validation template from the validation instructions in the message.

10. The method of claim 8 wherein the obtaining a validation template comprises obtaining an external validation template from a network based on an external identifier.

11. The method of claim 8 wherein the validation template comprises a document type definition.

12. The method of claim 8 wherein the validation template comprises a schema.

13. The method of claim 12 wherein the schema defines the grammar, structure and data types required for a valid document.

14. The method of claim 8 wherein the message includes an XML document, the XML document including XML application data to be validated and the validation instructions.

15. The method of claim 10 and further comprising storing a local copy of the external validation template after the template is retrieved from the network.

16. A method comprising:

receiving a message including validation instructions;

obtaining a validation template for the message based on the validation instructions according to the following:

using an internal validation template if the validation template is provided internal or inline to the message;

using a local copy of a validation template if the template is stored locally and not internal to the document; and otherwise, retrieving a copy of the validation template from a network;

validating at least a portion of the application data based on the validation template;

if the at least portion of the application data is valid, then storing the validation template in a local cache if retrieved from the network;

removing the validation instructions from the message, said validation instructions comprising at least one of said validation template and a pointer to said validation template; and sending the validated message to a processing node or application server for processing;

otherwise, blocking or inhibiting sending of the message.

17. A tangible medium storing a computer program, the computer program causing the following to occur when executed by a computer or a computing node:

receive a message including application data and validation instructions;

obtain a validation template for the message based on the validation instructions;

validate at least a portion of the application data based on the validation template;

if the at least portion of the application data is valid, then store the validation template in a local cache;

remove the validation instructions from the message, said validation instructions comprising at least one of said validation template and a pointer to said validation template; and send the validated message to a processing node or application server for processing;

otherwise, block or inhibit sending of the message.

18. A network apparatus coupled between a network and a plurality of processing nodes or applications servers, the network apparatus comprising a validation accelerator operable to validate at least a portion of a message based on a validation template, if the at least portion of the message is valid, said validation accelerator operable to store said validation template in a local cache after validating, to remove validation instructions from the message, said validation instructions comprising at least one of said validation template and a pointer to said validation template and to add a pre-validation indication to the message before sending the message to the application server or other processing node;

otherwise, said validation accelerator operable to block or inhibit sending of the message.

19. The network apparatus of claim 18 the validation accelerator to confirm that the message meets a basic syntax of a language or is well-formed and then to add a well-formed indication to the message before sending the message to an application server or other processing node.

20. A method comprising:

receiving a message including application data and validation instructions;

obtaining a validation template for the message;

validating at least a portion of the application data based on the validation template;

if the at least portion of the application data is valid, then storing the validation template in a local cache;

removing the validation instructions from the message, said validation instructions comprising at least one of said validation template and a pointer to said validation template;

adding a pre-validation indication to the message; and sending the validated message to a processing node or application server for processing;

otherwise, blocking or inhibiting sending of the message.

21. The method of claim 20 wherein the adding comprises indicating in a field of the message that at least a portion of the application data has been validated.

22. The method of claim 20 wherein the adding comprises adding an instruction or comment in the application data itself indicating that the application data has been pre-validated.

23. The method of claim 22 wherein the adding comprises adding a processing instruction tag indicating that the application data has been pre-validated.

24. A method comprising:

receiving a message including application data and validation instructions;

obtaining a validation template for the message;

determining whether the message is valid as compared to the validation template; and if the message is valid, then storing the validation template in a local cache, removing the validation instructions from the message, said validation instructions comprising at least one of said validation template and a pointer to said validation template, and sending the validated message to a processing node or application server for processing;

otherwise, blocking or inhibiting forwarding or sending of the message.

25. The method of claim 24 and, if the message is valid, altering the message to include an explicit or implicit pre-validation indication before sending the message to a processing node or application server.

26. A method comprising:

receiving a message including application data and validation instructions;

obtaining a validation template for the message based on the validation instructions;

determining whether the message is valid as compared to the validation template; and if the message is valid, then:
  storing the validation template in a local cache;
  removing the validation instructions, said validation instructions comprising at least one of said validation template and a pointer to said validation template; and
  sending the validated message to a processing node or application server for processing; and otherwise, sending the message to a processing node or application server, including the validation instructions.

27. The method of claim 26 and if the message is valid, further adding a pre-validation indication to the message before sending the valid message to the processing node or application server.

28. A method comprising:

receiving a message including application data and validation instructions;

obtaining a validation template for the message based on the validation instructions, including:
  obtaining the validation template from local memory or cache if present locally;
  otherwise, retrieving the validation template from a remote location;

validating at least a portion of the application data based on the validation template;

if the at least portion of the application data is valid, then
  storing the validation template in a local cache if retrieved from the remote location;
  removing the validation instructions from the message, said validation instructions comprising at least one of said validation template and a pointer to said validation template; and
  sending the validated message to a processing node or application server for processing;

otherwise, blocking or inhibiting sending of the message.

* * * * *

UNITED STATES PATENT AND TRADEMARK OFFICE
CERTIFICATE OF CORRECTION

| | | |
|---|---|---|
| PATENT NO. | : 7,146,422 B1 | Page 1 of 1 |
| APPLICATION NO. | : 09/562104 | |
| DATED | : December 5, 2006 | |
| INVENTOR(S) | : Marlatt et al. | |

It is certified that error appears in the above-identified patent and that said Letters Patent is hereby corrected as shown below:

On the Title page, in item (75), in "Inventors", in column 1, line 1, delete "SanDiego" and insert -- San Diego --, therefor.

Column 12, line 33, in Claim 19, after "claim 18" insert -- , --.

Signed and Sealed this

Twenty-seventh Day of February, 2007

JON W. DUDAS
*Director of the United States Patent and Trademark Office*